US009278582B2

(12) United States Patent
Stuckey (10) Patent No.: US 9,278,582 B2
(45) Date of Patent: Mar. 8, 2016

(54) TIRE TREAD HAVING DEVELOPING GROOVES

(75) Inventor: Jon I. Stuckey, Louisville, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 1207 days.

(21) Appl. No.: 12/974,593

(22) Filed: Dec. 21, 2010

(65) Prior Publication Data

US 2012/0152421 A1 Jun. 21, 2012

(51) Int. Cl.
| | |
|---|---|
| *B60C 11/03* | (2006.01) |
| *B60C 11/13* | (2006.01) |
| *B60C 11/12* | (2006.01) |
| *B60C 11/11* | (2006.01) |
| *B60C 11/04* | (2006.01) |

(52) U.S. Cl.
CPC ........... *B60C 11/0306* (2013.04); *B60C 11/032* (2013.04); *B60C 11/0309* (2013.04); *B60C 11/1323* (2013.04); *B60C 11/042* (2013.04); *B60C 11/1307* (2013.04); *B60C 11/1315* (2013.04); *B60C 2011/0341* (2013.04); *B60C 2011/0348* (2013.04); *B60C 2011/0351* (2013.04); *B60C 2011/0381* (2013.04); *B60C 2011/0383* (2013.04); *B60C 2011/1338* (2013.04)

(58) Field of Classification Search
CPC ............ B60C 11/1315; B60C 11/1323; B60C 11/042; B60C 11/0309
USPC ............................ 152/209.24, 209.21, 209.27
See application file for complete search history.

(56) References Cited

U.S. PATENT DOCUMENTS

| | | |
|---|---|---|
| 3,055,410 A | 9/1962 | Caulkins |
| 3,664,402 A | 5/1972 | Montagne |
| 4,258,691 A | 3/1981 | Nakayama |
| 4,284,115 A | 8/1981 | Ohnishi |
| 4,423,760 A | 1/1984 | Treves et al. |
| 4,446,901 A | 5/1984 | Endo et al. |
| 4,550,756 A | 11/1985 | Hinkel |
| 4,619,300 A | 10/1986 | Tokunaga et al. |
| 4,630,661 A | 12/1986 | Stelzer |

(Continued)

FOREIGN PATENT DOCUMENTS

| | | | | |
|---|---|---|---|---|
| JP | 01204805 A | * | 8/1989 | ............ B60C 11/04 |
| JP | 03070605 A | * | 3/1991 | ............ B60C 11/11 |

(Continued)

OTHER PUBLICATIONS

Kim Sung Soo, International Search Report and Written Opinion, May 21, 2012, pp. 1-9, Korean Intellectual Property Office.

(Continued)

*Primary Examiner* — Steven D Maki
*Assistant Examiner* — Kendra Ly (57) ABSTRACT

A tire having a tread comprising two shoulder ribs and at least one main rib, wherein the two shoulder ribs and the at least one main rib form at least two shoulder grooves. The two shoulder grooves each have a plurality of inboard walls and a plurality of outboard walls, each disposed at a substantially constant angle from a base of the shoulder groove to a shoulder rib surface. Further, the plurality of inboard walls includes a first set of walls disposed at a first angle from the base of the shoulder groove to a main rib surface and a second set of walls disposed at a second angle from the base of the shoulder groove to the main rib surface.

20 Claims, 11 Drawing Sheets

(56) References Cited

U.S. PATENT DOCUMENTS

| | | | |
|---|---|---|---|
| 4,703,788 A * | 11/1987 | Kusube et al. ............ 152/209.21 |
| 4,796,683 A | 1/1989 | Kawabata et al. | |
| 4,832,099 A | 5/1989 | Matsumoto | |
| D315,127 S | 3/1991 | White et al. | |
| 5,044,414 A | 9/1991 | Ushikubo | |
| 5,099,899 A | 3/1992 | Takeuchi | |
| D328,268 S | 7/1992 | Constant et al. | |
| 5,205,879 A | 4/1993 | Seitz et al. | |
| D338,179 S | 8/1993 | Miller et al. | |
| 5,293,918 A | 3/1994 | Tsuda et al. | |
| 5,345,988 A | 9/1994 | Kabe et al. | |
| 5,363,895 A | 11/1994 | Wells et al. | |
| 5,388,625 A | 2/1995 | White | |
| 5,407,005 A | 4/1995 | Consolacion et al. | |
| 5,415,215 A | 5/1995 | Covert et al. | |
| 5,417,268 A | 5/1995 | Kishi | |
| 5,421,387 A | 6/1995 | Emerson | |
| 5,450,885 A | 9/1995 | Hanya | |
| 5,479,973 A | 1/1996 | Ikeda | |
| 5,526,858 A | 6/1996 | Ikeda | |
| 5,529,101 A | 6/1996 | Croyle et al. | |
| 5,535,798 A | 7/1996 | Nakamura | |
| 5,567,253 A | 10/1996 | Iwamura | |
| 5,618,360 A | 4/1997 | Sakuno | |
| 5,628,843 A | 5/1997 | Hanya | |
| 5,669,993 A | 9/1997 | Moseley et al. | |
| D384,618 S | 10/1997 | Guspodin et al. | |
| D390,518 S | 2/1998 | White et al. | |
| 5,769,977 A | 6/1998 | Masaoka | |
| D400,135 S | 10/1998 | Blankenship et al. | |
| 5,957,179 A | 9/1999 | Graas | |
| 5,964,267 A | 10/1999 | Poque et al. | |
| 6,012,499 A | 1/2000 | Masaoka | |
| 6,065,517 A | 5/2000 | Maruyama | |
| 6,095,216 A | 8/2000 | Cenni et al. | |
| 6,112,788 A | 9/2000 | Ikeda | |
| 6,206,064 B1 | 3/2001 | Takahashi | |
| D445,071 S | 7/2001 | Brightwell et al. | |
| 6,336,485 B1 | 1/2002 | Kaneko et al. | |
| D458,583 S | 6/2002 | Villamizar | |
| 6,412,531 B1 | 7/2002 | Janajreh | |
| 6,450,223 B1 | 9/2002 | Landers et al. | |
| 6,527,024 B1 | 3/2003 | Ashmore | |
| 6,564,841 B2 | 5/2003 | Tozawa et al. | |
| 6,595,254 B2 | 7/2003 | Iizuka et al. | |
| D484,093 S | 12/2003 | Masuko | |
| D488,433 S | 4/2004 | Umstot et al. | |
| D490,047 S | 5/2004 | Heinen et al. | |
| 6,736,175 B2 | 5/2004 | Carra et al. | |
| D491,135 S | 6/2004 | Lassan et al. | |
| 6,792,985 B2 | 9/2004 | Matsumoto | |
| D497,143 S | 10/2004 | Lee et al. | |
| D498,460 S | 11/2004 | Himuro | |
| 6,889,733 B2 | 5/2005 | Gerresheim et al. | |
| D510,065 S | 9/2005 | Kuramochi et al. | |
| D512,012 S | 11/2005 | Delu et al. | |
| D515,021 S | 2/2006 | Delu et al. | |
| D515,498 S | 2/2006 | Dumigan | |
| 7,041,184 B2 | 5/2006 | Carra et al. | |
| D524,231 S | 7/2006 | Marazzi et al. | |
| D524,233 S | 7/2006 | Marazzi et al. | |
| D524,235 S | 7/2006 | Marazzi et al. | |
| D524,236 S | 7/2006 | Marazzi et al. | |
| D531,108 S | 10/2006 | Marazzi et al. | |
| D531,112 S | 10/2006 | Williams | |
| D531,113 S | 10/2006 | Dixon et al. | |
| 7,114,540 B2 | 10/2006 | Miyazaki | |
| D534,484 S | 1/2007 | Feider et al. | |
| 7,178,570 B2 | 2/2007 | Murata | |
| 7,182,113 B2 * | 2/2007 | Saguchi .................... 152/209.2 |
| 7,208,110 B2 | 4/2007 | Lopez et al. | |
| D544,431 S | 6/2007 | Graas et al. | |
| 7,234,497 B2 | 6/2007 | Yamane | |
| D546,272 S | 7/2007 | Shinohara et al. | |
| D550,609 S | 9/2007 | Ibaraki | |
| D551,156 S | 9/2007 | Shinohara et al. | |
| D551,157 S | 9/2007 | Shondel | |
| D551,158 S | 9/2007 | Collette et al. | |
| D554,052 S | 10/2007 | Dumigan et al. | |
| 7,290,578 B2 | 11/2007 | Nguyen et al. | |
| 7,337,816 B2 | 3/2008 | Canankamp et al. | |
| 7,392,832 B2 | 7/2008 | Roesgen et al. | |
| 7,490,646 B2 | 2/2009 | Bogenschuetz et al. | |
| 7,503,361 B2 | 3/2009 | Metz | |
| D611,893 S * | 3/2010 | Iwabuchi et al. ............ D12/601 |
| 2005/0076986 A1 | 4/2005 | Sagachi | |
| 2009/0255614 A1 | 10/2009 | Ebiko | |

FOREIGN PATENT DOCUMENTS

| | | | |
|---|---|---|---|
| JP | H0370605 A | 3/1991 | |
| JP | 04008607 A * | 1/1992 | ............ B60C 11/06 |
| JP | 04019203 A * | 1/1992 | ............ B60C 11/04 |
| JP | 04306105 A * | 10/1992 | ............ B60C 11/06 |
| JP | 2003159911 | 6/2003 | |
| JP | 2003211916 | 7/2003 | |
| JP | 2004203299 A | 7/2004 | |
| JP | 2009248961 | 10/2009 | |
| JP | H0419203 | 3/2010 | |
| KR | 1020060065298 A | 6/2006 | |

OTHER PUBLICATIONS

KR 10-2006-0065298 A—English Abstract and Figures pp. 1-6.
Office Action; Corresponding Chinese Application No. 201180061666.2; Authorized Officer Qian Yazhuo; Feb. 15, 2015.
Office Action (Translation); Corresponding Japanese Application No. 2003-546142; Authorized Officer N. Kajimoto; Sep. 29, 2015.
Office Action (Translation); Corresponding Mexican Application No. 2003-546142; Translated by Alfredo Rangel; Sep. 21, 2015.

* cited by examiner

Figure 12

TIRE TREAD HAVING DEVELOPING GROOVES

FIELD OF INVENTION

The present application is directed to tires with developing grooves in the tread. More particularly, the present application is directed to tires with developing shoulder and main grooves in the tread.

BACKGROUND

As a tire wears, its circumferential tread decreases in radial thickness. In addition, tread elements such as grooves, ribs, and sipes decrease in radial thickness. For example, a series of lateral grooves may be in communication with a first shoulder and a second shoulder when the tire is new, but not be in communication with the first and second shoulders when the tire is worn because at least one of the lateral grooves has a depth less than the depths of the remaining lateral grooves.

SUMMARY

A tire having a tread comprising two shoulder ribs and at least one main rib, wherein the two shoulder ribs and the at least one main rib form at least two shoulder grooves. The two shoulder grooves each have a plurality of inboard walls and a plurality of outboard walls, each disposed at a substantially constant angle from a base of the shoulder groove to a shoulder rib surface. Further, the plurality of inboard walls includes a first set of walls disposed at a first angle from the base of the shoulder groove to a main rib surface and a second set of walls disposed at a second angle from the base of the shoulder groove to the main rib surface.

BRIEF DESCRIPTION OF THE DRAWINGS

In the accompanying drawings, structures are illustrated that, together with the detailed description provided below, describe exemplary embodiments of a tire tread having developing grooves. One of ordinary skill in the art will appreciate that a single component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Block" refers to a discrete tread element defined by a plurality of slots and grooves.

"Circumferential" and "circumferentially" refer to lines or directions extending along the perimeter of the surface of the tread parallel to the equatorial plane perpendicular to the axial direction of the tire.

"Equatorial plane" refers to the plane that is perpendicular to the tire's axis of rotation and passes through the center of the tire's tread.

"Groove" refers to an elongated void area in the tread of the tire that extends circumferentially in a straight, curved or zig-zag manner.

"Lateral" or "laterally" refer to a direction along the tread of the tire going from one sidewall of the tire to the other sidewall.

"Radial" or "radially" refer to a direction perpendicular to the axis of rotation of the tire.

"Rib" or "ribs" define the circumferential extending strip or strips of rubber on the tread that is defined by at least one circumferential groove and either a second wide groove or a lateral edge of the tread.

"Sidewall" refers to that portion of the tire between the tread and the bead.

"Sipe," as used herein, refers to a thin slit formed in the surface of the tread that may extend laterally, circumferentially, or at an acute angle relative to the circumferential direction of the tire. A sipe can have a depth that is up to 100% of the maximum depth of a groove or slot formed in the tire.

"Slot," as used herein, refers to an elongated void in the tread of the tire that extends laterally, at an acute angle relative to the circumferential direction of the tire, or in a zigzag manner.

"Tread" refers to that portion of the tire that comes into contact with the road under normal load.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

In the illustrated embodiments discussed below, a tire having a tread has 2-fold rotational symmetry about its equatorial plane. Therefore, for the sake of brevity, while the left hemisphere of the tread is described in detail, it should be understood that the right hemisphere exhibits the same elements, rotated 180 degrees about a plane parallel with an equatorial plane. In alternative embodiments (not shown), the tire may have reflection symmetry about its equatorial plane. In other alternative embodiments (not shown), the tire may have other reflection, rotational, or translational symmetries or it may be asymmetric.

Figure 1:
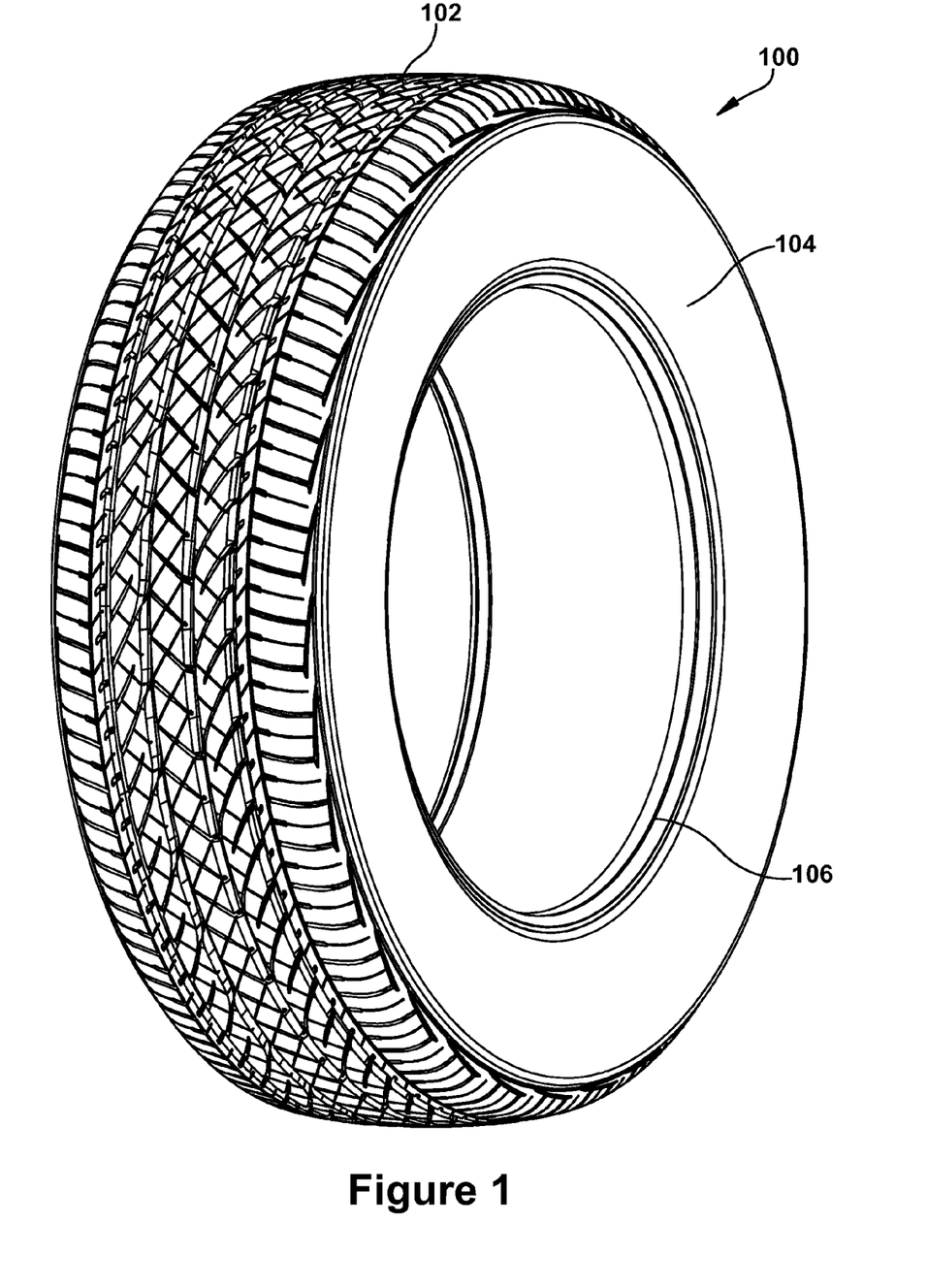
FIG. 1 illustrates a perspective view of one embodiment of a tire.
Figure 2:
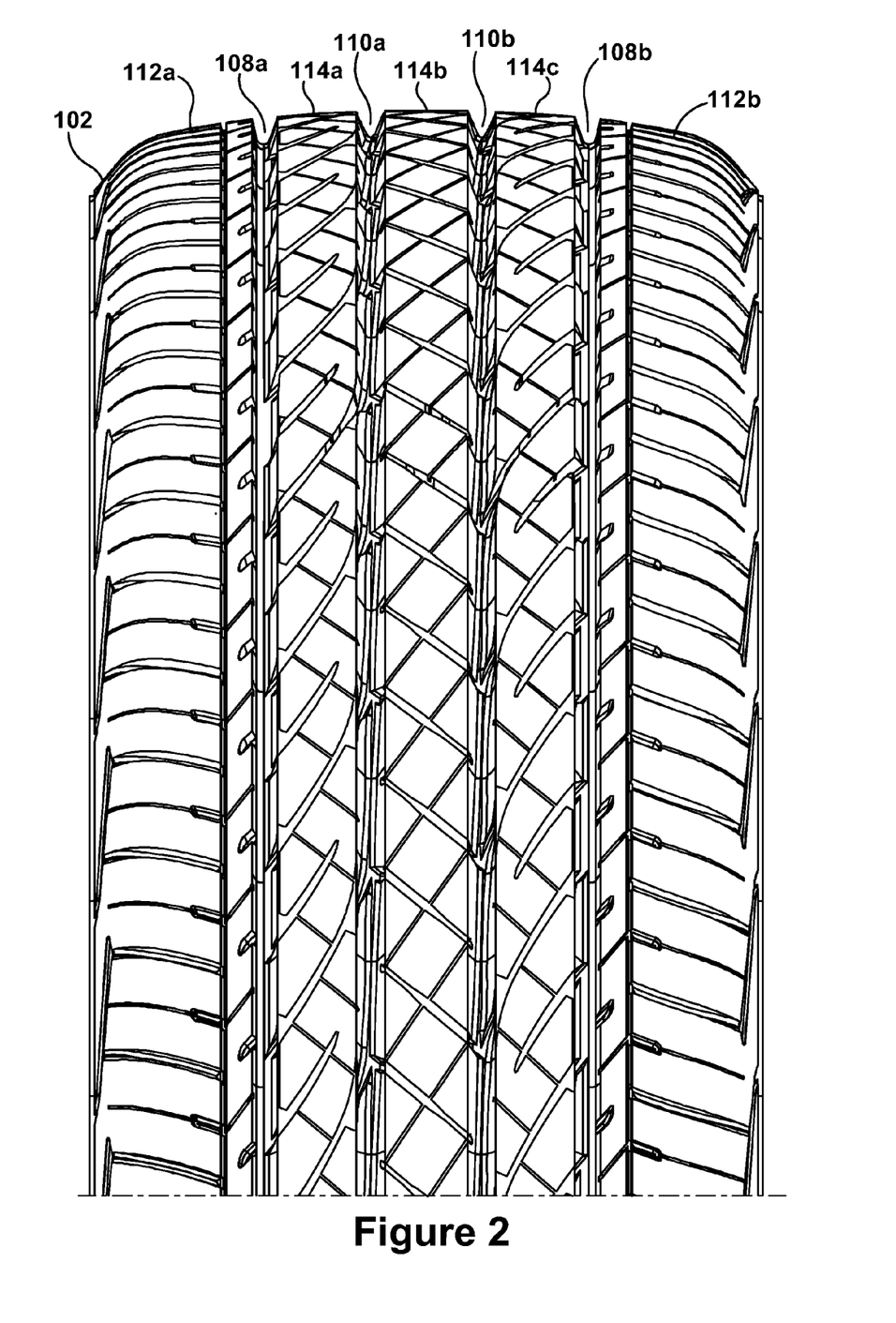
FIG. 2 is a partial plan view of the tire illustrated in FIG. 1.

FIGS. 1 and 2 illustrate a perspective view and a partial plan view, respectively, of a tire 100 having a circumferentially extending tread 102, sidewalls 104, and bead portions 106. Tread 102 is partially defined by first and second shoulder grooves 108a,b and first and second main grooves 110a,b that extend circumferentially around the tire 100, thereby dividing tread 102 into a plurality of axially spaced-apart ribs. In another embodiment (not shown), the tread includes more than two main grooves. In alternative embodiments (not shown), the tread can include n number of circumferential grooves and n+1 number of circumferential ribs, where n is equal to 1 or more. In another embodiment (not shown), the tread does not include a central rib that is centered with respect to the equatorial plane.

The plurality of axially spaced-apart ribs include first and second shoulder ribs 112a,b, first and second intermediate ribs 114a,c, and a central rib 114b. Central rib 114b is centered with respect to an equatorial plane (not shown) of the tire 100 and shoulder ribs 112a,b. First and second intermediate ribs 114a and 114c are located between central rib 114b and first and second shoulder ribs 112a and 112b, respectively. In another embodiment (not shown), the tread includes more than two intermediate ribs.

Figure 3A:
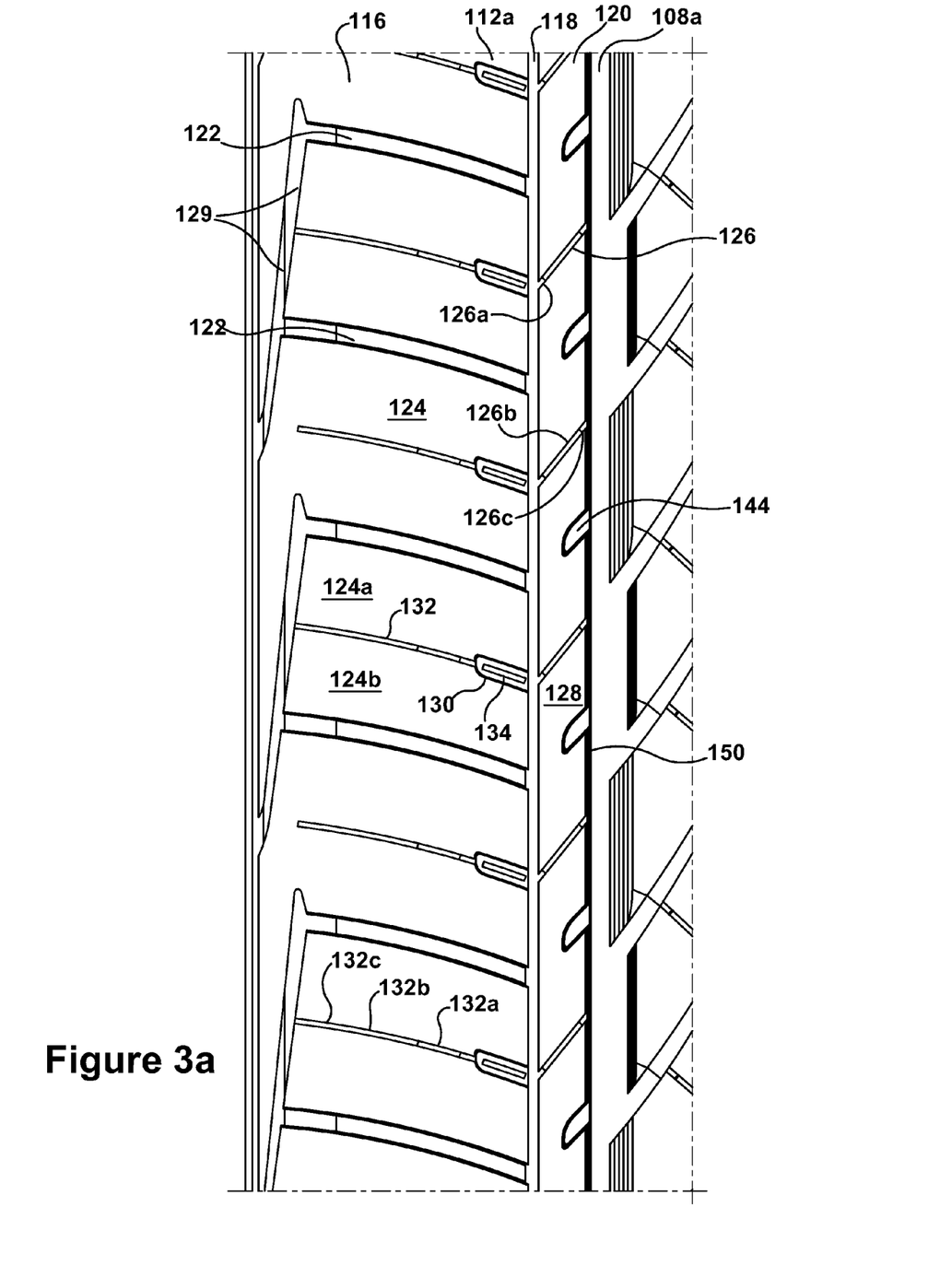
FIGS. 3a-c illustrate partial plan views of tread portions of the tire illustrated in FIGS. 1-2.

FIG. 3a illustrates a partial plan view of a portion of tread 102 of tire 100, further illustrating features of first shoulder rib 112a. Shoulder rib 112a includes first rib portion 116, a circumferentially extending narrow groove 118, and a second rib portion 120. First rib portion 116 includes curved lateral grooves 122 that divide first rib portion 116 into circumferentially spaced-apart blocks 124. Curved lateral grooves 122 extend from circumferentially extending narrow groove 118, across the lateral width of blocks 124, and into a first rib portion groove 129 that extends circumferentially and laterally to the outer side of tire 100.

Blocks 124 of first rib portion 116 include a plurality of edges and a partial lateral groove 130 joined to a slot 132, partially dividing alternating blocks 124 into an upper portion 124a and a lower portion 124b. In the remaining blocks, slot 132 is in communication with first rib portion groove 129, completely dividing the remaining blocks into upper portions 124a and lower portions 124b. A sipe 134 extends axially along the bottom surface of partial groove 130 between narrow groove 118 and slots 132.

Slot 132 includes a first portion 132a, a second portion 132b, and a third portion 132c that extends close to a lateral edge of tread 102. First portion 132a, second portion 132b, and third portion 132c vary in depth.

First rib portion groove 129 forms a complete circumferential border for every other block 124 and joins two curved lateral grooves 122. Remaining blocks 124 have a partial circumferential border formed by a part of first rib portion groove 129.

In the illustrated embodiment, second rib portion 120 includes angled lateral slots 126 that extend between circumferentially extending narrow groove 118 and first shoulder groove 108a, thereby dividing second rib portion 120 into circumferentially spaced-apart blocks 128. Blocks 128 include a plurality of first circumferential walls 150 and a partial lateral groove 144.

Slots 126 have a first portion 126a extending from circumferentially extending narrow groove 118, a second portion 126b, and a third portion 126c extending into first shoulder groove 108a. First portion 126a, second portion 126b, and third portion 126c vary in depth. Curved lateral grooves 122 have a larger width than angled lateral slots 126, and curved lateral grooves 122 and angled lateral slots 126 are at an acute angle relative to a lateral axis (not shown).

Although FIG. 3a illustrates particular straight and curved grooves and slots and ribs made of blocks described above, it should be understood that any combination of straight, curved, zig-zag, or wavy grooves, slots, and sipes of any width and any type of rib with and without blocks may be employed.

Figure 3B:
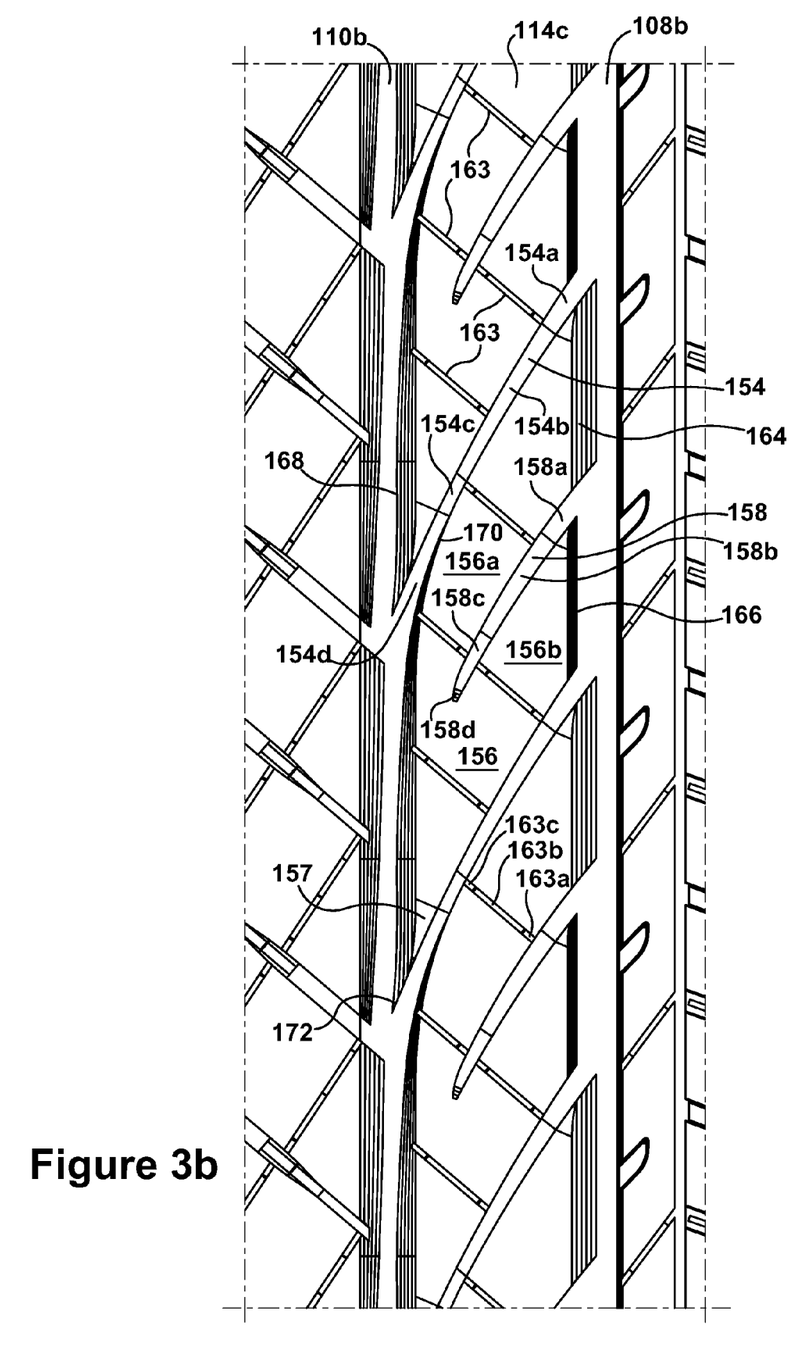

FIG. 3b is a partial plan view of a portion of tread 102 of tire 100, further illustrating features of second intermediate rib 114c. Second intermediate rib 114c includes curved lateral grooves 154 that divide second intermediate rib 114c into circumferentially spaced-apart blocks 156 having a tapered surface 157 that extends into second main groove 110b. Blocks 156 also include a partial lateral groove 158 dividing each block 156 into a first portion 156a and a second portion 156b. Blocks 156 further include sipes 163, a first circumferential wall 164, a second circumferential wall 166, and a third circumferential wall 168 having a leading edge 170 and a trailing edge 172. In another embodiment (not shown), blocks 156 of the intermediate rib 114c include more or less than three circumferential walls.

Curved lateral grooves 154 include a first portion 154a extending from second shoulder groove 108b, a second portion 154b, a third portion 154c, and a fourth portion 154d extending into second main groove 110b. First portion 154a, second portion 154b, third portion 154c, and fourth portion 154d vary in depth.

Partial lateral grooves 158 include a first portion 158a extending from second shoulder groove 108b, a second portion 158b, a third portion 158c, and a fourth portion 158d that radially tapers to the upper surface of block 156. First portion 158a, second portion 158b, third portion 158c, and fourth portion 158d vary in depth.

Sipes 163 in second intermediate rib 114c span across various portions of blocks 156 and include a first portion 163a, a second portion 163b, and a third portion 163c. First portion 163a, second portion 163b, and third portion 163c vary in depth. In the illustrated embodiment, each block 156 includes four sipes 163. In another embodiment (not shown), blocks 156 include less than or more than four sipes. In yet another embodiment (not shown), sipes 163 include a different number of portions than what is illustrated in FIG. 3b.

Although FIG. 3b illustrates particular straight and curved grooves and slots and ribs made of blocks described above, it should be understood that any combination of straight, curved, zig-zag, or wavy grooves, slots, and sipes of any width and any type of rib with and without blocks may be employed.

Figure 3C:
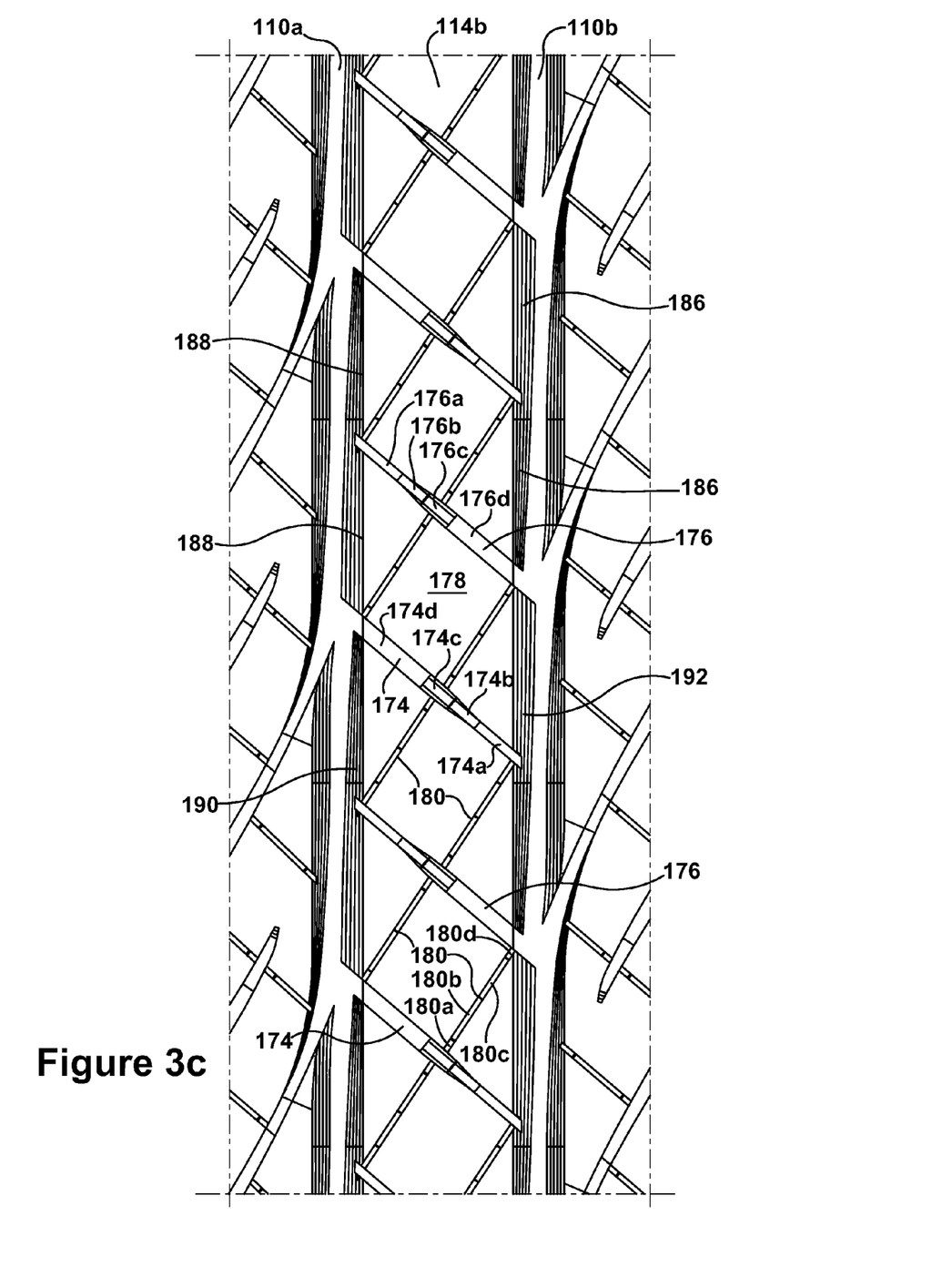

FIG. 3c is a partial plan view of the portion of tread 102 of tire 100, further illustrating features of central rib 114b. Central rib 114b includes first angled lateral grooves 174 and second angled lateral grooves 176 that divide central rib 114b into circumferentially spaced-apart blocks 178 having a plurality of sipes 180. First angled lateral grooves 174 and second angled lateral grooves 176 are similar, except they are oriented in opposite directions. First angled lateral grooves 174 are narrow towards a first circumferential edge 186 of the central rib 114b and wider at a second circumferential edge 188 of the central rib 114b. Second angled lateral grooves 176 are wider at the first circumferential edge 186 of the central rib 114b and narrow towards the second circumferential edge 188 of the central rib 114b.

Central rib 114b further includes a first circumferential wall 190 and a second circumferential wall 192. First circumferential walls 190 extend from second circumferential edges 188 of two blocks 178 down to a bottom surface of first main groove 110a and are intersected by second angled lateral groove 176. Second circumferential walls 192 extend from first circumferential edges 186 of two blocks 178 down to the bottom of second main groove 110b and are divided by first angled lateral groove 174. In another embodiment (not shown), central rib includes more than two circumferential walls that have more than two angles relative to planes that are parallel to the equatorial plane.

First angled lateral grooves 174 include a first portion 174a extending from second main groove 110b, a tapered second portion 174b, a tapered third portion 174c, and a fourth portion 174d extending to first main groove 110a. First portion 174a and tapered second portion 174b have a radial depth less than that of tapered third portion 174c and fourth portion 174d. Further, second angled lateral grooves 176 include a first portion 176a extending from first main groove 110a, a tapered second portion 176b, a tapered third portion 176c, and a fourth portion 176d extending to main groove 110b. First portion 176a and tapered second portion 176b have a radial depth less than that of tapered third portion 176c and fourth portion 176d. In another embodiment (not shown), angled lateral grooves have a number of portions less than or greater than four.

In the illustrated embodiment, each block 178 includes two sipes 180 that are in communication with a first angled lateral groove 174 and a second angled lateral groove 176. Sipes 180 each include a first portion 180a, a second portion 180b, a third portion 180c, and a fourth portion 180d. First portion 180a, second portion 180b, third portion 180c, and fourth portion 180d vary in depth. In another embodiment (not shown), each block 178 includes a number of sipes that are different from the number illustrated in FIG. 3c. In yet another embodiment (not shown), each block 178 includes a number of sipe portions that are different from the number illustrated in FIG. 3c.

Although FIG. 3c illustrates particular straight and curved grooves and slots and ribs made of blocks described above, it should be understood that any combination of straight, curved, zig-zag, or wavy grooves, slots, and sipes of any width and any type of rib with and without blocks may be employed.

Figure 4:
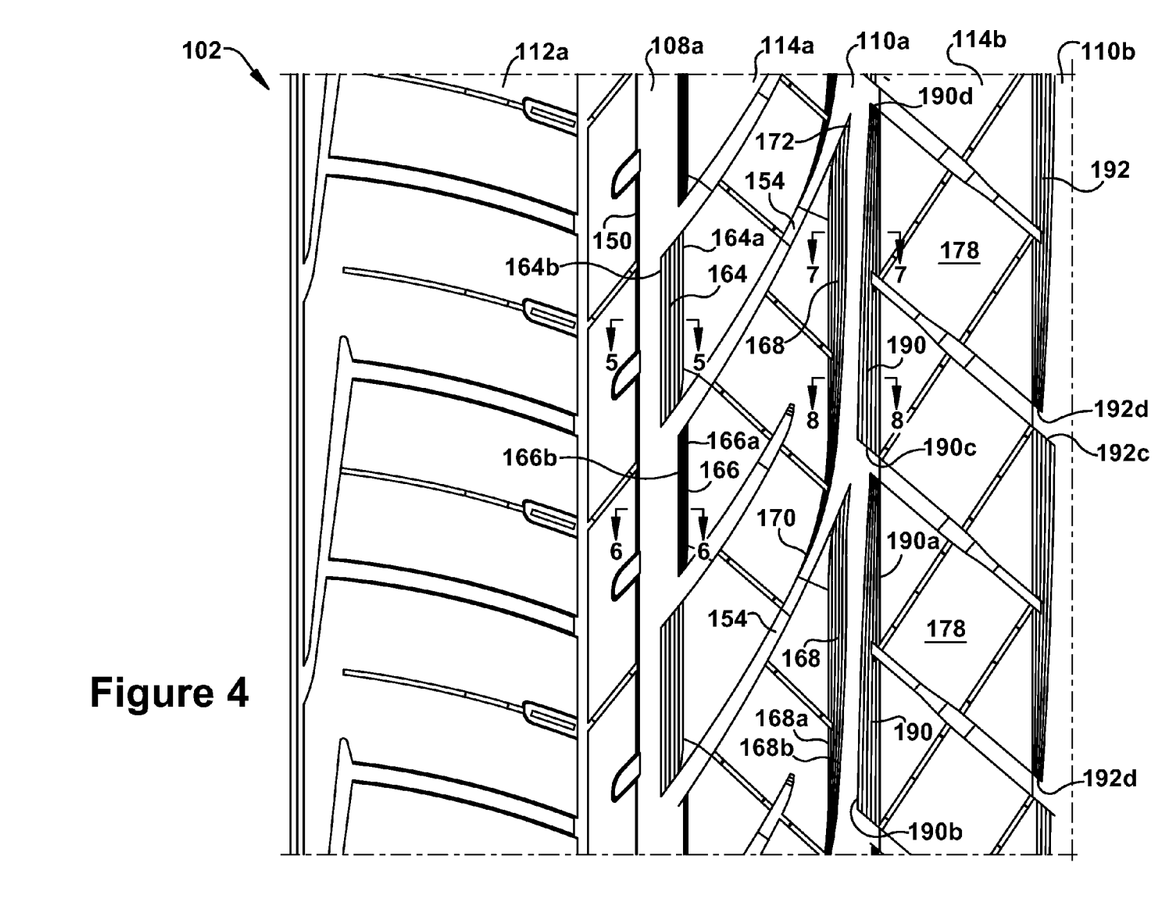
FIG. 4 illustrates a partial plan view of a section of the tread of the tire illustrated in FIG. 1.

FIG. 4 illustrates a portion of tread 102 of the tire 100. First shoulder groove 108a is defined by first shoulder rib 112a and first intermediate rib 114a, including a plurality of inboard shoulder groove walls and a plurality of outboard shoulder groove walls. Specifically, first shoulder groove 108a is defined on an outward side by a plurality of first circumferential walls 150 of first shoulder rib 112a and defined on an inward side by a plurality of first circumferential walls 164 and a plurality of second circumferential walls 166 of first intermediate rib 114a. It should be understood that shoulder groove 108b (not shown) is substantially the same as shoulder groove 108a.

Figure 5:
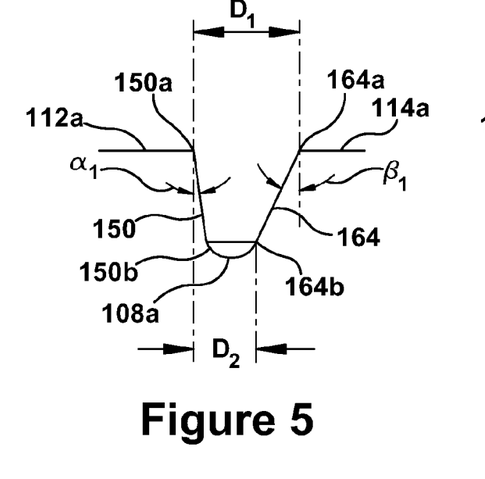
FIG. 5 is a cross-section of a groove along line 5-5 shown in FIG. 4.

FIG. 5 is a cross-section of shoulder groove 108a along line 5-5 shown in FIG. 4. First circumferential wall 150 of first shoulder rib 112a extends linearly to a bottom surface of shoulder groove 108a between first edge 150a and second portion 150b at a first alpha angle $\alpha_1$ relative to a plane parallel with the equatorial plane. In the illustrated embodiment, first alpha angle $\alpha_1$ is six degrees. In another embodiments (not shown), first alpha angle $\alpha_1$ ranges from zero and fifteen degrees. In yet another embodiment (not shown), the surface of the first circumferential wall 150 includes a curved portion.

First circumferential wall 164 of first intermediate rib 114a extends linearly to the bottom surface of the shoulder groove 108a between first edge 164a and second portion 164b at a first beta angle $\beta_1$ relative to a plane parallel to the equatorial plane. In the illustrated embodiment, first beta angle $\beta_1$ is twenty-five degrees. In another embodiment (not shown), first beta angle $\beta_1$ fifteen degrees. In yet another embodiment (not shown), first beta angle $\beta_1$ ranges from zero and thirty-five degrees. In another embodiment (not shown), the surface of the first circumferential wall 164 includes a curved portion. In yet another embodiment (not shown), the surface of the first circumferential wall 164 includes a plurality of distinct edges at different radial heights that form a series of steps between first edge 164a and second portion 164b.

In the illustrated embodiment, the lateral distance between first edge 150a of first circumferential wall 150 and first edge 164a of first circumferential wall 164 is a first distance $D_1$, wherein first distance $D_1$ is 0.3 inches. In alternative embodiments, first distance $D_1$ can range from 0.2-0.5 inches.

As the tire tread wears, the lateral distance between the edges narrows until the tire tread is 100% worn, where the lateral distance between an edge of the second portion 150b of first circumferential wall 150 and an edge of the second portion 164b of first circumferential wall 164 is a second distance $D_2$ of 0.1 inches. $D_2$ is measured at the location of the tread wear indicator that has a radial height of about 1.6 millimeter or 2/32 inch above the base of the groove. In alternative embodiments, second distance $D_2$ can range from 0.1-0.3 inches, and first distance $D_1$ is greater than second distance $D_2$.

Figure 6:
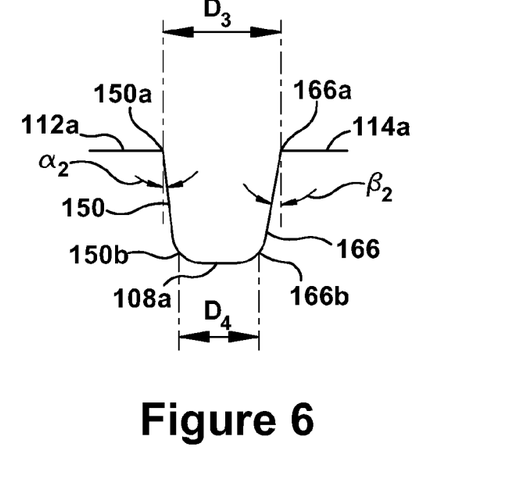
FIG. 6 is a cross-section of a groove along line 6-6 shown in FIG. 4.

FIG. 6 is a cross-sectional view of first shoulder groove 108a along line 6-6 shown in FIG. 4. First circumferential wall 150 of first shoulder rib 112a extends linearly down to a bottom surface of shoulder groove 108a between first edge 150a and second portion 150b at a second alpha angle $\alpha_2$ relative to a plane parallel with the equatorial plane. In the illustrated embodiment, second alpha angle $\alpha_2$ is six degrees. In another embodiment (not shown), second alpha angle $\alpha_2$ ranges from zero and fifteen degrees. In yet another embodiment (not shown), the surface of the first circumferential wall 150 includes a curved portion.

Second circumferential wall 166 of first intermediate rib 114a extends linearly down to the bottom of shoulder groove 108a between first edge 166a and second portion 166b at a second beta angle $\beta_2$ relative to a plane parallel with the equatorial plane. In the illustrated embodiment, second beta angle $\beta_2$ is ten degrees. In another embodiment (not shown), second beta angle $\beta_2$ is fifteen degrees. In yet another embodiment (not shown), second beta angle $\beta_2$ ranges from five to twenty degrees. In another embodiment (not shown), the surface of second circumferential wall 166 includes a curved portion. In yet another embodiment (not shown), the surface of second circumferential wall 166 includes a plurality of distinct edges at different radial heights that form a series of steps between first edge 166a and second portion 166b.

First edge 166a of second circumferential wall 166 is parallel to first edge 164a of first circumferential wall 164 illustrated in FIG. 5. Additionally, second portion 166b of second circumferential wall 166 is parallel to second portion 164b of first circumferential wall 164 illustrated in FIG. 5.

In the illustrated embodiment, the axial distance between first edge 150a of first circumferential wall 150 and first edge 166a of second circumferential wall 166 is a third distance $D_3$, wherein $D_3$ is equal to $D_1$ plus or minus 0.2 inches.

As the tire tread wears, the axial distance between edges narrows until the tire tread is 100% worn, wherein the axial distance between second portion 150b of first circumferential wall 150 and second portion 166b of second circumferential wall 166 is a fourth distance $D_4$ is greater than $D_2$ plus 0.2 inches.

In the illustrated embodiment of FIGS. 5 and 6, when the tire is new, first distance $D_1$ is equal to third distance $D_3$. As the tread wears, the lateral distances between the first and second circumferential walls 150, 164 along line 5-5 and line 6-6 are not the same. In other words, the lateral width of first shoulder groove 108a varies along the circumference of groove 108a as the tire tread wears.

In another embodiment (not shown), the inboard wall is at a single angle and the outboard wall includes a plurality of angles.

With reference back to FIG. 4, first main groove 110a includes a plurality of inboard main groove walls and a plurality of outboard main groove walls. Specifically, first main groove 110a is defined on an outward side by a plurality of third circumferential walls 168 of first intermediate rib 114a and on an inward side by a plurality of first circumferential walls 190 of central rib 114b. Third circumferential walls 168 curve laterally between leading edge 170 and trailing edge 172. The plurality of first circumferential walls 190 extend circumferentially between a first end 190c and a second end 190d.

Figure 7:
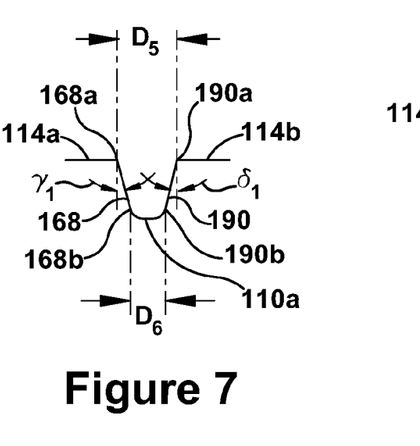
FIG. 7 is a cross-section of a groove along line 7-7 shown in FIG. 4.

FIG. 7 is a cross-section of first main groove 110a along line 7-7 shown in FIG. 4. At this location, third circumferential wall 168 of first intermediate rib 114a extends to a bottom surface of main groove 110a between first edge 168a and second portion 168b at a first gamma angle $\gamma_1$ relative to a plane (not shown) parallel with the equatorial plane. In the illustrated embodiment, first gamma angle $\gamma_1$ is twenty-five degrees. In another embodiment (not shown), first gamma angle $\gamma_1$ ranges from ten to forty degrees.

Also at this location, first circumferential wall 190 of central rib 114b extends to the bottom surface of main groove 110a between first edge 190a and second portion 190b at a first delta angle $\delta_1$ relative to a plane (not shown) parallel with the equatorial plane. In the illustrated embodiment, first delta angle $\delta_1$ is fifteen degrees. In another embodiment (not shown), first delta angle $\delta_1$ ranges from zero and thirty degrees. In yet another embodiment (not shown), third circumferential walls 168 and first circumferential walls 190 include a plurality of distinct edges that extend between first edge 168a and second portion 168b and first edge 190a and second portion 190b, respectively. In another embodiment (not shown), the surfaces of first circumferential walls 190 include curved portions.

In the illustrated embodiment, the axial distance between first edge 168a of third circumferential wall 168 and first edge 190a of first circumferential wall 190 is a fifth distance $D_5$ of 0.5 inches. In alternative embodiments, fifth distance $D_5$ can range from 0.2-0.8 inches. As the tire tread wears, the lateral distance between these edges narrows until the tire tread is 100% worn, wherein the axial distance between second portion 168b of third circumferential wall 168 and second edge 190a of first circumferential wall 190 is a sixth distance $D_6$, wherein $D_6$ ranges from 0.1 inch to $D_5$ minus 0.1 inches.

Figure 8:
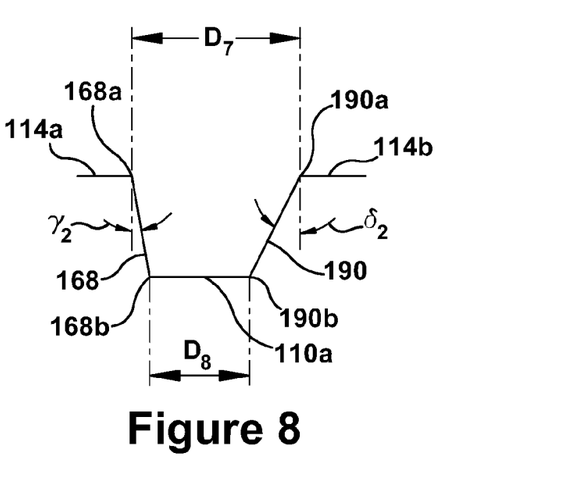
FIG. 8 is a cross-section of a groove along line 8-8 shown in FIG. 4.

FIG. 8 is a cross-section of first main groove 110a along line 8-8 shown in FIG. 4. At this location, third circumferential wall 168 of first intermediate rib 114a extends to the bottom surface of main groove 110a between first edge 168a and second portion 168b at a second gamma angle $\gamma_2$ relative to a plane (not shown) parallel with the equatorial plane. In the illustrated embodiment second gamma angle $\gamma_2$ is ten degrees. In another embodiment (not shown), second gamma angle $\gamma_2$ ranges from zero and thirty degrees. In yet another embodiment (not shown), the circumferential wall may include wall portions disposed at different angles. For example, a lower wall portion may be disposed at an angle of ten degrees, a middle wall portion may be disposed at an angle of twenty degrees, and an upper wall portion may be disposed at an angle of twenty-five degrees.

Also at this location, first circumferential wall 190 of central rib 114b extends to the bottom surface of main groove 110a between first edge 190a and second portion 190b at a second delta angle $\delta_2$ relative to a plane (not shown) parallel with the equatorial plane. In the illustrated embodiment, second delta angle $\delta_2$ is forty-five degrees. In another embodiment (not shown), second delta angle $\delta_2$ ranges from ten to sixty degrees.

In yet another embodiment (not shown), the circumferential wall may include wall portions disposed at different angles. For example, a lower wall portion may be disposed at an angle of zero degrees, a first middle wall portion may be disposed at an angle of ten degrees, a second middle wall portion may be disposed at an angle of twenty degrees, and an upper wall portion may be disposed at an angle of twenty-five degrees. In yet another embodiment (not shown), third circumferential walls 168 and first circumferential walls 190 include a plurality of distinct edges that extend between first edge 168a and second portion 168b and first edge 190a and second portion 190b, respectively. In another embodiment (not shown), the surface of first circumferential walls 190 include a curved portion.

In the illustrated embodiment, the lateral distance between first edge 168a of third circumferential wall 168 and first edge 190a of first circumferential wall 190 is a seventh distance $D_7$ of 0.5 inches. In alternative embodiments, seventh distance $D_7$ can range from 0.2-0.8 inches. As the tire tread wears, the axial distance between these edges narrows until the tire tread is 100% worn, wherein the axial distance between second portion 168b of third circumferential wall 168 and second portion 190b of first circumferential wall 190 is an eighth distance $D_8$, wherein $D_8$ ranges from 0.1 inch to $D_7$ minus 0.1 inches.

Figure 9:
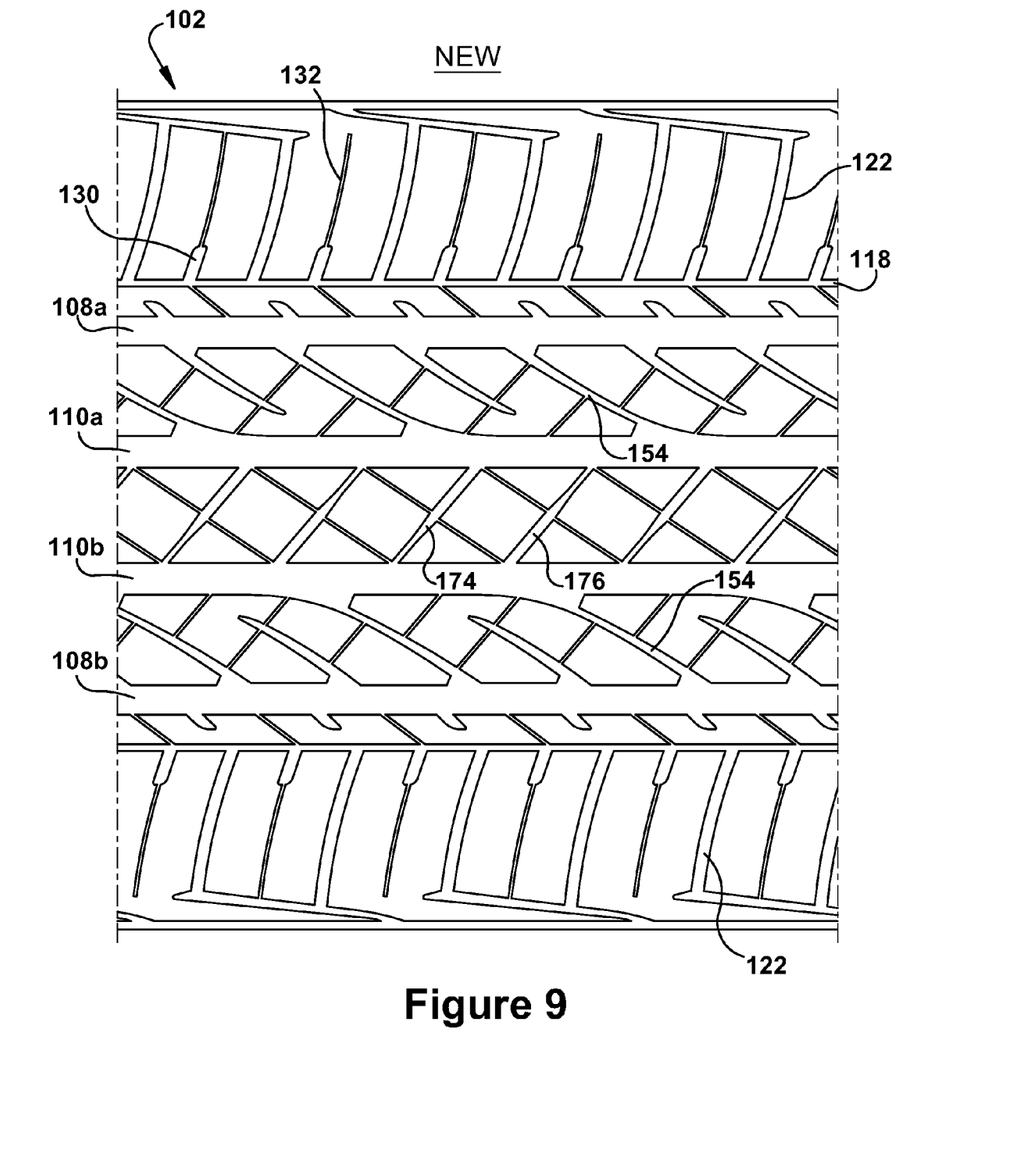
FIG. 9 illustrates a partial plan view of a tire surface of a tread portion of the tire illustrated in FIG. 1 when the tread is new.

FIGS. 9-12 illustrate footprints of a portion of tread 102 at different stages of wear. FIG. 9 illustrates a tire surface of the portion of tread 102 when it is new, i.e., 0% worn. In the illustrated embodiment, first and second shoulder grooves 108a,b and first and second main grooves 110a,b are substantially straight. First angled lateral groove 174 and second angled lateral groove 176 are in communication with main grooves 110a,b. Further, a series of curved lateral grooves 154 provide a clear path between shoulder grooves 108a,b and main grooves 110a,b, respectively. The curved lateral grooves 122 and first and second angled lateral slots 126 provide a clear path between first and second shoulder grooves 108*a,b* and a respective shoulder. In addition, various partial grooves and sipes in the circumferential ribs are in communication with lateral and circumferential grooves.

Figure 10:
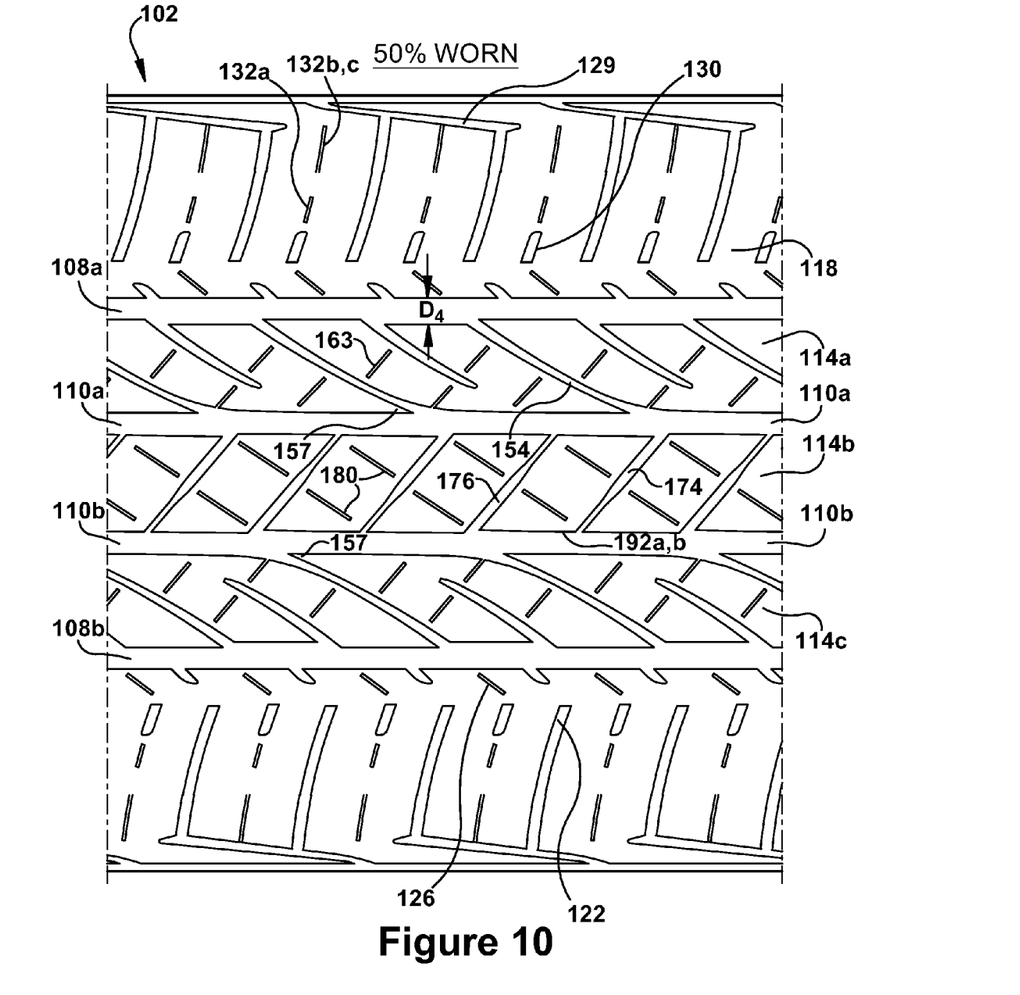
FIG. 10 illustrates a partial plan view of a tire surface of a tread portion of the tire illustrated in FIG. 1 when the tread has 50% wear.

FIG. 10 illustrates a tire surface of a portion of tread 102 when it is 50% worn. In the illustrated embodiment, lateral widths of the first and second shoulder grooves 108*a,b* vary in the circumferential direction as tread 102 wears because the wall angles of intermediate ribs 114*a,c* vary. This variation creates multiple lateral widths $LW_1$ and $LW_2$ that repeat around the circumference of tread 102. Lateral widths $LW_1$ and $LW_2$ are less than first distance $D_1$ and third distance $D_3$, respectively, discussed above. In addition, edges 190*a* and 192*a* that protrude into first and second main grooves 110*a,b* are partially exposed. At this level of tread wear, some lateral grooves and sipes are no longer in communication with lateral and circumferential grooves. For example, curved lateral grooves 122 and angled lateral slots 126 are not in communication with the first and second shoulder grooves 108*a,b*.

Also illustrated in FIG. 10, circumferentially extending narrow grooves 118 are completely worn away when tread 102 wears down 50%. Further, first portion 132*a*, second portion 132*b*, third portion 132*c* of slots 132, and partial lateral grooves 130 (not shown) in shoulder ribs 112*a,b* are partially worn away, such that slots 132 no longer are in communication with first rib portion grooves 129 and circumferentially extending narrow grooves 118 (as illustrated in FIG. 9). In addition, curved lateral grooves 122, curved lateral grooves 154, first lateral grooves 174, and second lateral grooves 176 do not form a continuous path across the tread width of tire 100 because curved lateral grooves 122 no longer extend into shoulder grooves 108*a,b*. Further, sipes 180 do not completely extend between first lateral grooves 174 and second lateral grooves 176 because first portions 180*a* (not shown) and fourth portions 180*d* (not shown) are worn away. In the illustrated embodiment, portions of sipes 163 in intermediate ribs 114*a,c* are also worn away. Therefore, curved lateral grooves 154 are no longer in communication with sipes and the curved lateral grooves are not in communication with the partial lateral grooves 158.

Figure 11:
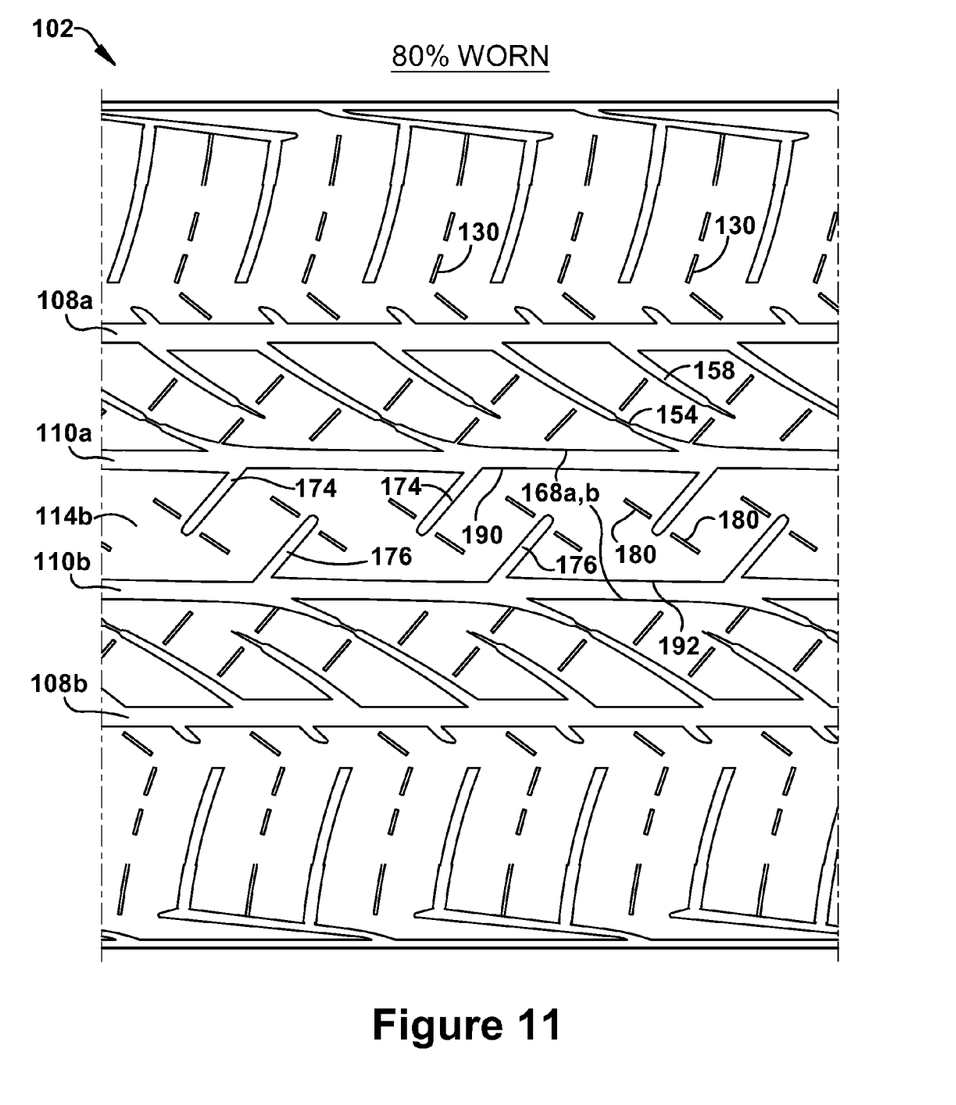
FIG. 11 illustrates a partial plan view of a tire surface of a tread portion of the tire illustrated in FIG. 1 when the tread has 80% wear.

FIG. 11 illustrates a tire surface of a portion of tread 102 when it is about 80% worn. Footprint of tread 102 shows a greater disparity between the various lateral widths of first and second shoulder grooves 108*a,b* than at 50% wear. Specifically, lateral widths $LW_3$ and $LW_4$ are less than lateral widths $LW_4$ and $LW_2$, respectively, discussed above. Additionally, first and second main grooves 110*a,b* have a more distinct zig-zag shape. Edges 168*a-b* of third circumferential walls 168, edges 190*a-b* of first circumferential walls 190, and edges 192*a-b* of second circumferential walls 192 have different radial and lateral positions at this stage of tread wear relative to their radial and lateral positions in the tire surfaces illustrated in FIGS. 9 and 10. In the illustrated embodiment, first lateral grooves 174 and second lateral grooves 176 in central rib 114*b* do not connect first and second main grooves 110*a,b* when tread 102 is about 80% worn.

Sipes 163 in first and second intermediate ribs 114*a,c* are further worn away at 80% of wear (relative to FIG. 10). Therefore, curved lateral grooves 154 and partial lateral grooves 158 are further disconnected from one another. Partial lateral grooves 130 have transformed into narrow grooves or sipes. In addition, first angled lateral grooves 174 extend from first main groove 110*a*, but do not extend into second main groove 110*b*. Similarly, second angled lateral grooves 176 extend from second main groove 110*b*, but do not extend into first main groove 110*a*.

Figure 12:
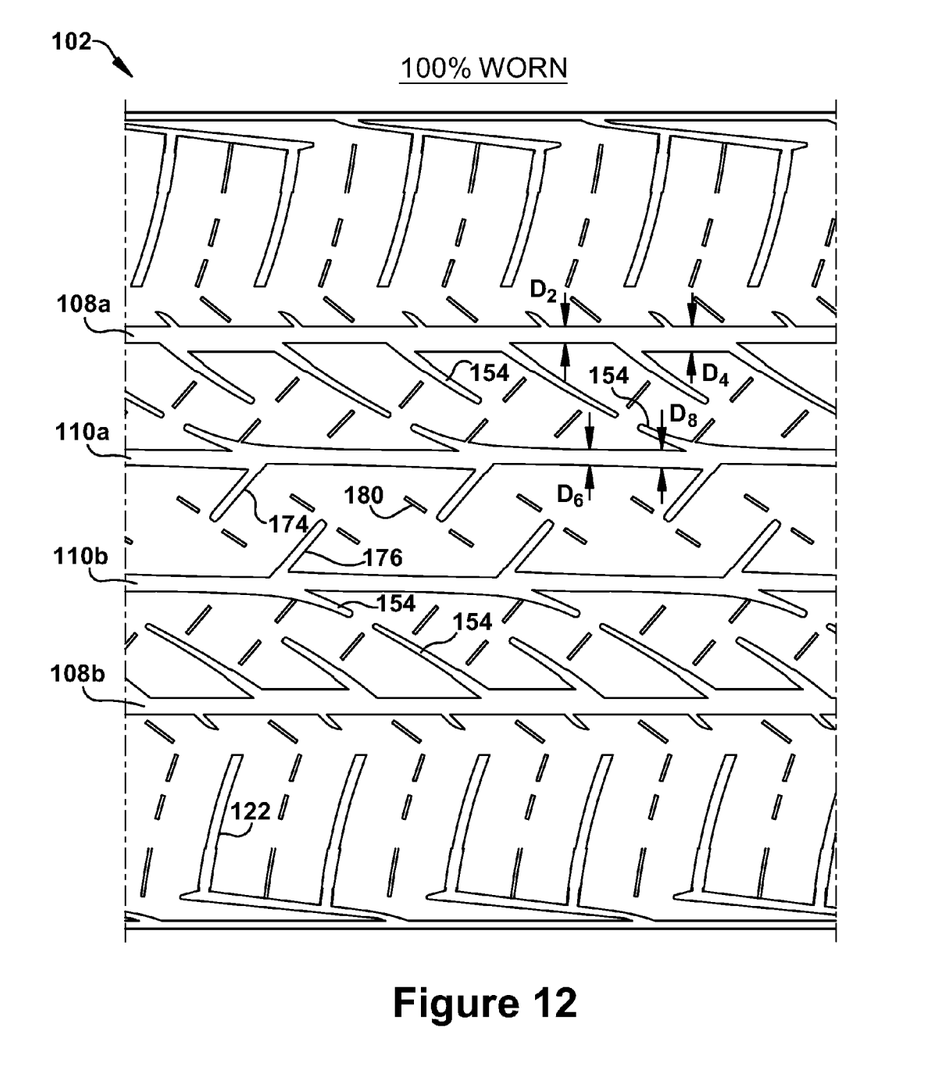
FIG. 12 illustrates a partial plan view of a tire surface of a tread portion of the tire illustrated in FIG. 1 when the tread has 100% wear.

FIG. 12 illustrates a tire surface of a portion of tread 102 when it is about 100% worn (worn to tread wear indicators (not shown)). In this illustrated embodiment, tread 102 includes first and second shoulder grooves 108*a,b* having varying lateral widths, i.e., second and fourth distances $D_2$ and $D_4$, and first and second main grooves 110*a,b* having zig-zag shapes. In addition, curved lateral grooves 122, curved lateral grooves 154, first lateral grooves 174, and second lateral grooves 176 do not connect adjacent circumferential grooves. For example, the grooves, do not provide a path between first shoulder groove 108*a* and first main groove 110*a*, do not provide a path between first main groove 110*a* and second main groove 110*b*, and do not provide a path between second main groove 110*b* and second shoulder groove 108*b*. Curved lateral grooves 154 in first and second intermediate ribs 114*a,c* have worn and do not provide a path between first and second shoulder grooves 108*a,b* to first and second main grooves 110*a,b*, respectively.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A tire comprising:
   a pair of sidewalls;
   a pair of bead portions;
   a circumferential tread further comprising:
   two shoulder ribs,
   at least two intermediate ribs, each intermediate rib including a plurality of blocks,
   wherein each block is located between full lateral grooves,
   wherein each of the blocks has a first portion and a second portion,
   wherein each block in the plurality of blocks includes a partial lateral groove extending partially into each block between the first and second portion of each block,
   a central rib,
   at least two circumferential shoulder grooves, each circumferential shoulder groove having a plurality of inboard circumferential shoulder groove walls extending from a groove base to a ground contacting surface of the circumferential tread and a plurality of outboard circumferential shoulder groove walls extending from a groove base to the ground contacting surface of the circumferential tread,     wherein the plurality of outboard circumferential shoulder groove walls each have a substantially constant angle relative to a plane parallel to an equatorial plane of the tire along the entire circumferential length of the tire,     wherein the plurality of inboard circumferential shoulder groove walls includes first inboard circumferential shoulder groove walls at a first angle relative to a plane parallel to an equatorial plane of the tire and second inboard circumferential shoulder groove walls at a second angle relative to a plane parallel to an equatorial plane of the tire different from the first angle,     wherein each first inboard circumferential shoulder groove wall is disposed on the first portion of a block and each second inboard circumferential shoulder groove wall is disposed on the second portion of the block,     wherein the first angle is constant on the first portion of each block between the full lateral groove and partial lateral groove, and the second angle is constant on the second portion of each block between the partial lateral groove and the full lateral groove,     wherein each of the at least two circumferential shoulder grooves has a substantially constant width around a circumference of the tire when the circumferential tread is new, and     wherein each of the at least two circumferential shoulder grooves has a plurality of widths when the circumferential tread is at least partially worn; and at least two main circumferential grooves, each main circumferential groove having a plurality of inboard main circumferential groove walls and a plurality of outboard main circumferential groove walls,     wherein each of the at least two main circumferential grooves has a substantially constant width when the circumferential tread is new, and     wherein each of the at least two main circumferential grooves has a plurality of widths when the circumferential tread is at least partially worn.

2. The tire of claim 1, wherein each of the two shoulder ribs includes a first rib portion and a second rib portion separated by a circumferentially extending narrow groove that has a depth less than a depth of each of the at least two circumferential shoulder grooves.

3. The tire of claim 2, wherein each of the two shoulder ribs includes partial lateral grooves joined to slots, and wherein each of the at least two intermediate ribs includes partial lateral grooves and a plurality of sipes, and wherein the central rib includes sipes.

4. The tire of claim 3, wherein the partial lateral grooves in the two shoulder ribs extend to the circumferentially extending narrow groove, wherein each of the partial lateral grooves in the at least two intermediate ribs extends to one of the two circumferential shoulder grooves, and wherein the sipes in the central rib extend between circumferentially spaced first and second angled lateral grooves.

5. The tire of claim 1, wherein the two shoulder ribs have a plurality of circumferentially spaced curved lateral grooves and angled lateral slots forming a plurality of circumferentially spaced blocks, and the central rib has a plurality of circumferentially spaced first and second angled lateral grooves forming a plurality of circumferentially spaced blocks.

6. The tire of claim 1, wherein the first inboard circumferential shoulder groove walls are each disposed at an angle of twenty-five degrees, wherein the second inboard circumferential shoulder groove walls are each disposed at an angle of ten degrees, and wherein the plurality of outboard circumferential shoulder groove walls are at an angle of six degrees.

7. The tire of claim 1, wherein the plurality of outboard main circumferential groove walls are each disposed at a first angle from 10 to 40 degrees at a first circumferential location and at a second angle from zero to thirty degrees at a second circumferential location, and wherein the plurality of inboard main circumferential groove walls are each disposed at a third angle of about ten degrees at the first circumferential location and a fourth angle of about forty-five degrees at the second circumferential location.

8. The tire of claim 1, wherein the main circumferential grooves have a zig-zag shape when the circumferential tread is at least partially worn.

9. A tire having a circumferential tread, the circumferential tread comprising:

two shoulder ribs;
at least two intermediate ribs; and
a central rib, wherein each shoulder rib and each intermediate rib form circumferential shoulder grooves, each circumferential shoulder groove having a plurality of outboard circumferential shoulder groove walls extending from a groove base to a ground contacting surface of the circumferential tread, a plurality of blocks making up the intermediate ribs, the blocks being separated by first lateral grooves, and each block including a second lateral groove that divides the block into a first portion and a second portion,     wherein each first portion has a first inboard circumferential shoulder groove wall extending from a groove base to a ground contacting surface of the circumferential tread, and each second portion has second inboard circumferential shoulder groove wall extending from a groove base to the ground contacting surface of the circumferential tread, wherein the first inboard circumferential shoulder groove walls and the second inboard circumferential shoulder groove walls define a plurality of lateral widths of the circumferential shoulder grooves along a circumference of the tire at different levels of tread wear, wherein the first inboard circumferential shoulder groove walls are disposed at a first angle relative to a plane that is parallel to an equatorial plane of the tire, the first angle being constant between the first lateral groove and the second lateral groove, wherein the second inboard circumferential shoulder groove walls are disposed at a second angle different from the first angle relative to a plane that is parallel to the equatorial plane of the tire, the second angle being constant between the second lateral groove and the first lateral groove, wherein the plurality of outboard circumferential shoulder groove walls are disposed at a third angle relative to a plane that is parallel to the equatorial plane of the tire along the entire circumferential length of the tire, wherein each of the circumferential shoulder grooves has a substantially constant width around a circumference of the tire when the circumferential tread is new, and wherein each of the circumferential shoulder grooves has a plurality of widths when the circumferential tread is at least partially worn.

10. The tire of claim 9, wherein the first angle is between zero and thirty-five degrees, the second angle is between five and twenty degrees, and the third angle is between zero and ten degrees.

11. The tire of claim 9, wherein the first and second inboard circumferential shoulder grooves walls have parallel edges.

12. The tire of claim 9, wherein the two shoulder ribs further comprise a first rib portion, a circumferentially extending groove, and a second rib portion, wherein the first rib portion further includes curved lateral grooves that divide the first rib portion into a plurality of circumferentially spaced-apart blocks, and wherein the second rib portion further includes angled lateral slots that divide the second rib portion into a plurality of circumferentially spaced-apart blocks, the curved lateral grooves of the first rib portion having a larger width than the angled lateral slots of the second rib portion.

13. The tire of claim 9, wherein the two shoulder ribs further comprise a plurality of circumferentially spaced curved lateral grooves and angled lateral slots forming a plurality of circumferentially spaced blocks.

14. The tire of claim 9, wherein the central rib has a plurality of circumferentially spaced first and second angled lateral grooves forming a plurality of circumferentially spaced blocks.

15. The tire of claim 9, wherein the circumferential shoulder grooves include at least two lateral widths including a first lateral width and a second lateral width, and wherein the first lateral width is greater than the second lateral width.

16. A tire having a circumferential tread comprising:
two shoulder ribs; and
at least one main rib,
wherein the two shoulder ribs and the at least one main rib form at least two circumferential shoulder grooves, and
wherein the two circumferential shoulder grooves each have a plurality of outboard walls, each disposed at a substantially constant angle from a base of the circumferential shoulder groove to a shoulder rib surface along the entire circumferential length of the tire, wherein the two circumferential shoulder grooves each have a plurality of inboard walls, including a first set of inboard walls disposed at a first angle from the base of the circumferential shoulder groove to a main rib surface and a second set of inboard walls disposed at a second angle from the base of the circumferential shoulder groove to the main rib surface, wherein each of the two circumferential shoulder grooves has a substantially constant width around a circumference of the tire when the circumferential tread is new, wherein each of the two circumferential shoulder grooves has a plurality of widths when the circumferential tread is at least partially worn;

the main rib including a plurality of blocks, wherein each of the plurality of blocks includes a partial lateral groove extending inward from the circumferential shoulder grooves, the partial lateral groove separating a first portion of the block from a second portion of the block, wherein the first set of inboard walls are only disposed on the first portions of the blocks and the second set of inboard walls are only disposed on the second portions of the blocks, and wherein the first angle of the first set of inboard walls is constant along the entire first portions of the blocks and the second angle of the second set of inboard walls is constant along the entire second portions of the blocks.

17. The tire of claim 16, wherein the two shoulder ribs further include a first rib portion, a circumferentially extending narrow groove, and a second rib portion, and wherein the outboard walls of the two circumferential shoulder grooves are defined by the second rib portion, and wherein the circumferentially extending narrow groove has a depth that is less than a depth of the at least two circumferential shoulder grooves.

18. The tire of claim 16, wherein the first angle is from zero to thirty-five degrees, and wherein the second angle is from five degrees to twenty degrees.

19. The tire of claim 16, wherein the at least one main rib includes at least a first intermediate rib and a second intermediate rib separated by at least one groove.

20. The tire of claim 16, wherein the two shoulder ribs have a plurality of circumferentially spaced curved lateral grooves and angled lateral slots forming a plurality of circumferentially spaced blocks.

* * * * *